(12) United States Patent
Burns (10) Patent No.: US 7,921,997 B2
(45) Date of Patent: Apr. 12, 2011

(54) ATTACHABLE DEVICE ACCESSORY CASE COVER WITH INTERCHANGEABLE COMPONENTS

(76) Inventor: James A. Burns, Austin, TX (US)

( * ) Notice: Subject to any disclaimer, the term of this patent is extended or adjusted under 35 U.S.C. 154(b) by 0 days.

(21) Appl. No.: 12/077,346

(22) Filed: Mar. 18, 2008

(65) Prior Publication Data

US 2008/0310094 A1    Dec. 18, 2008

Related U.S. Application Data (60) Provisional application No. 60/918,873, filed on Mar. 19, 2007.

(51) Int. Cl.
*B65D 85/00* (2006.01)

(52) U.S. Cl. .......... 206/320; 206/576; 206/701; 439/59; 439/76.1; 439/638; 361/683; 361/679.01; 361/679.55

(58) Field of Classification Search .................. 206/320, 206/576, 701; 361/679.01, 679.55, 683, 361/679.02, 679.21, 679.58; 439/501, 367, 439/59, 76.1, 638
See application file for complete search history.

(56) References Cited

U.S. PATENT DOCUMENTS

| | | | |
|---|---|---|---|
| 4,953,770 A * | 9/1990 | Bond, Sr. .................. 224/250 |
| 5,348,347 A * | 9/1994 | Shink ........................ 206/576 |
| 5,379,201 A | 1/1995 | Friedman | |
| 5,607,054 A | 3/1997 | Hollingsworth | |
| 5,664,673 A * | 9/1997 | Perry ......................... 206/371 |
| 5,701,230 A | 12/1997 | Liang | |
| 5,835,344 A | 11/1998 | Alexander | |
| 5,931,297 A | 8/1999 | Weill | |
| 6,026,961 A * | 2/2000 | McCarthy et al. ............ 206/576 |
| 6,149,001 A | 11/2000 | Akins | |
| 6,161,944 A | 12/2000 | Leman | |
| 6,209,734 B1 * | 4/2001 | Wang ......................... 211/87.01 |
| D443,417 S | 6/2001 | Hillman | |
| 6,264,029 B1 | 7/2001 | Motson | |
| 6,392,876 B1 | 5/2002 | Ramonowski | |
| 6,520,607 B2 | 2/2003 | Pfaff | |
| 6,693,367 B1 * | 2/2004 | Schmeisser et al. ..... 361/679.01 |
| 6,711,006 B2 * | 3/2004 | Chen ....................... 361/679.55 |
| 6,775,130 B2 | 8/2004 | Cronk | |
| 6,781,522 B2 * | 8/2004 | Sleva et al. ............... 361/679.01 |
| D510,348 S | 10/2005 | Kaczowka | |
| 6,974,223 B2 | 12/2005 | Krietzman | |
| D515,588 S | 2/2006 | Kirkwood | |
| 7,055,682 B1 * | 6/2006 | Domotor et al. ............. 206/214 |
| 2005/0152621 A1 * | 7/2005 | Healy ............................. 383/22 |
| 2007/0090007 A1 | 4/2007 | Ames | |

FOREIGN PATENT DOCUMENTS

GB    2418298    3/2006

* cited by examiner

*Primary Examiner* — J. Gregory Pickett
*Assistant Examiner* — Andrew Perreault

(57) ABSTRACT

A case apparatus attachable to a portable device enabling the storage and transport of a variety of articles. The apparatus is optimally configured with releasable components enabling interchange of various features including those which facilitate attachment to the device allowing a single case implementation to securely fit various device implementations. The apparatus includes a large utility panel which receives attachment of all other case components, smaller utility panels which receive attachment of various articles, compartment enclosures which cover the smaller utility panels while allowing easy access to their contents, a large presentation panel to cover and conceal the entire case assembly and contained contents but having openings to allow access to the compartment enclosures and either a strap and clasp retention assembly to bind the case around the device or a clip fastening assembly which attaches to corresponding fittings on an adapted device to fasten the case to the device.

14 Claims, 10 Drawing Sheets

ATTACHABLE DEVICE ACCESSORY CASE COVER WITH INTERCHANGEABLE COMPONENTS

CROSS-REFERENCE TO RELATED APPLICATIONS

This application claims the benefit of provisional patent application Ser. No. 60/918,873, filed 2007 Mar. 19 by the present inventor.

FEDERALLY SPONSORED RESEARCH

Not Applicable

SEQUENCE LISTING OR PROGRAM

Not Applicable

BACKGROUND

1. Field of Invention

This invention generally relates to portable electronic devices and, more specifically, an attachable portable device case cover with interchangeable components 2. Prior Art Portable laptop notebook computers and similarly configured devices have become more frequently used for both business and personal use. They have become less expensive and often more durable than their predecessors. Instead of just being used in one location, shut down, packed in a case, and taken to a new location, they are increasingly taken from room to room in the workplace or in the home. Typically, in order to carry the device along with its accessories and any other articles, the device and all of the other items would be inserted into a case, transported, and removed from the case to resume use. If any of the accessories require connection to the device, they would often have to be disconnected and reconnected at the new location. Consequently, there is an increasing need to accommodate storage, transport and deployment of frequently used accessories and articles that often accompany these portable devices.

The objective of some prior art has been to primarily transport and/or protect the device and secondarily to store accessories. There are several designs in the marketplace that are molded to tightly fit around a device and either snap onto device or be attached with adhesive. One invention, U.S. Pat. No. 6,149,001 to Akins, implements a glove-like structure into which the device is inserted. These approaches restrict an implementation of the case to limited implementations of the device.

Conversely, some commonly found solutions attempt to accommodate too many implementations of the device. Some employ straps made of elastic or other material to loosely span a broad area of the device to attach the case or cover. Although this design will accommodate a wide variety of devices, it does not allow for a secure attachment suitable for supporting the transportation of many accessories and articles. Additionally, the straps often obstruct vital parts of the device such as the display.

Some prior art propose modifying the device to include additional storage. One invention, U.S. Pat. No. 6,392,876 to Ramonowski, suggests storage compartments within the body of the device. This solution would only provide benefit to devices that have been adapted accordingly. Some similar art employ some post-manufacture adaptation means such as adhesives to attach a storage apparatus to the device which may cause the device to suffer permanent disfigurement as a result of the case installation.

Some solutions in the marketplace are "work-in" cases where the device is placed in case structure which may additionally contain storage space for accessories and other articles. To use the device, the case is placed where the device would normally be placed and then opened to allow access to and use of the device. In order to accommodate the device and any additional articles, the dimensions of the "work-in" case are typically significantly larger than those of the device. Therefore, the spaces where the device may normally be used would also have to be large enough to accommodate the "work-in" case. Additionally, prolonged use inside these types of cases is discouraged as problems from heat build-up may result.

The prior art examples having containment features employ some fixed-structure approach thereby preventing the implementation from being used in any manner which significantly deviates from the original design parameters.

SUMMARY OF THE INVENTION

For a portable device having at least one enclosure member, a case body which substantially conforms to the device and a means for controllably joining the case body to the device whereby the case can be securely attached to compatible devices with minimal adaptation. In a portable device an integrated means of joining an external structure to the device whereby compatible external structures may be securely attached to the device with minimal adaptation.

BRIEF DESCRIPTION OF THE DRAWINGS

FIG. 7B shows some alternative implementations of an interchangeable LED assembly DRAWINGS—Reference Numerals 10—attachable device accessory case cover with interchangeable components
12—Illuminated emblem
17a—portable device (rudimentary)
17b—portable device (advanced case)
17c—portable device (advanced case on adapted device)
18a—presentation panel (rudimentary case)
18b—presentation panel (advanced case)
22—USB hub (w/cables)
23—Intermediary USB cable
24—case utility panel
26a, 26b—retaining straps
27—repositionable sticker
28a, 28b—compartment enclosures
30a, 30b—compartment utility panel
32a, 32b—device/article utility panel
34a, 34b, 34c, 34d—strap clasps
35a, 35b, 35c, 35d—clips
36—strap clasp outer arm
37—clip outer arm
38—strap clasp inner arm
39—clip inner arm
40—strap clasp spring bar
41—clip hinge pin
42—strap clasp male snap
44—strap clasp female snap
50a, 50b, 50c, 50d—integrated clip fittings
60a, 60b, 60c, 60d—interchangeable LED assemblies with an illuminated emblem
62—flexible housing for LED assembly

DETAILED DESCRIPTION

Figure 1:
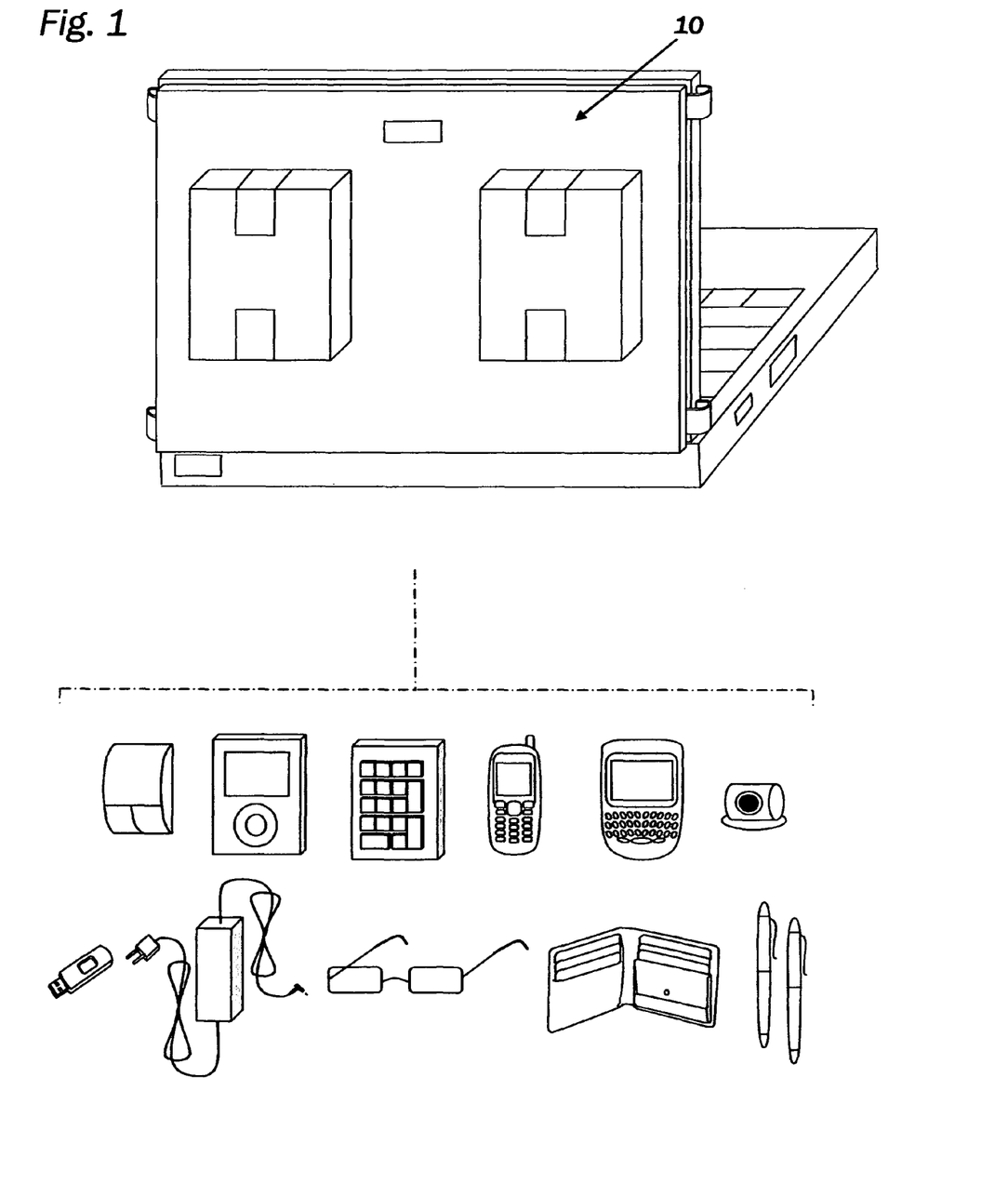
FIG. 1 shows an attachable device case cover attached to a laptop notebook computer along with some examples of the peripheral devices and personal articles that the case could accommodate
Figure 2A:
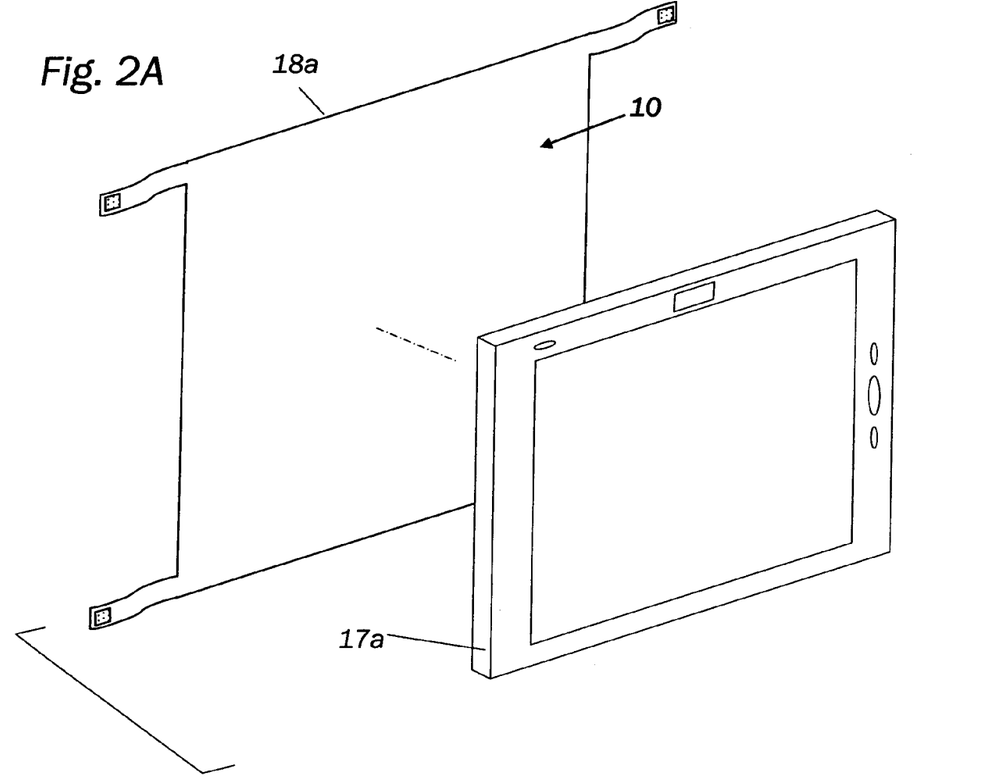
Figure 2B:
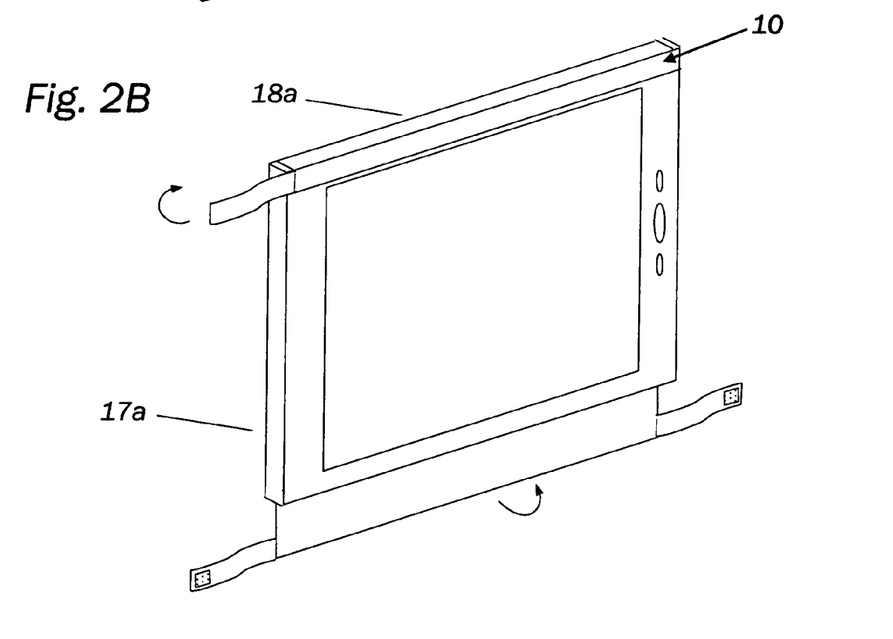

General Embodiment—FIG. 1

FIG. 1 shows an embodiment of an attachable portable device case cover with interchangeable components 10 attached to a notebook computer. The embodiment implements attachable containment features which can house various peripheral devices and/or personal articles.

Figure 3A:
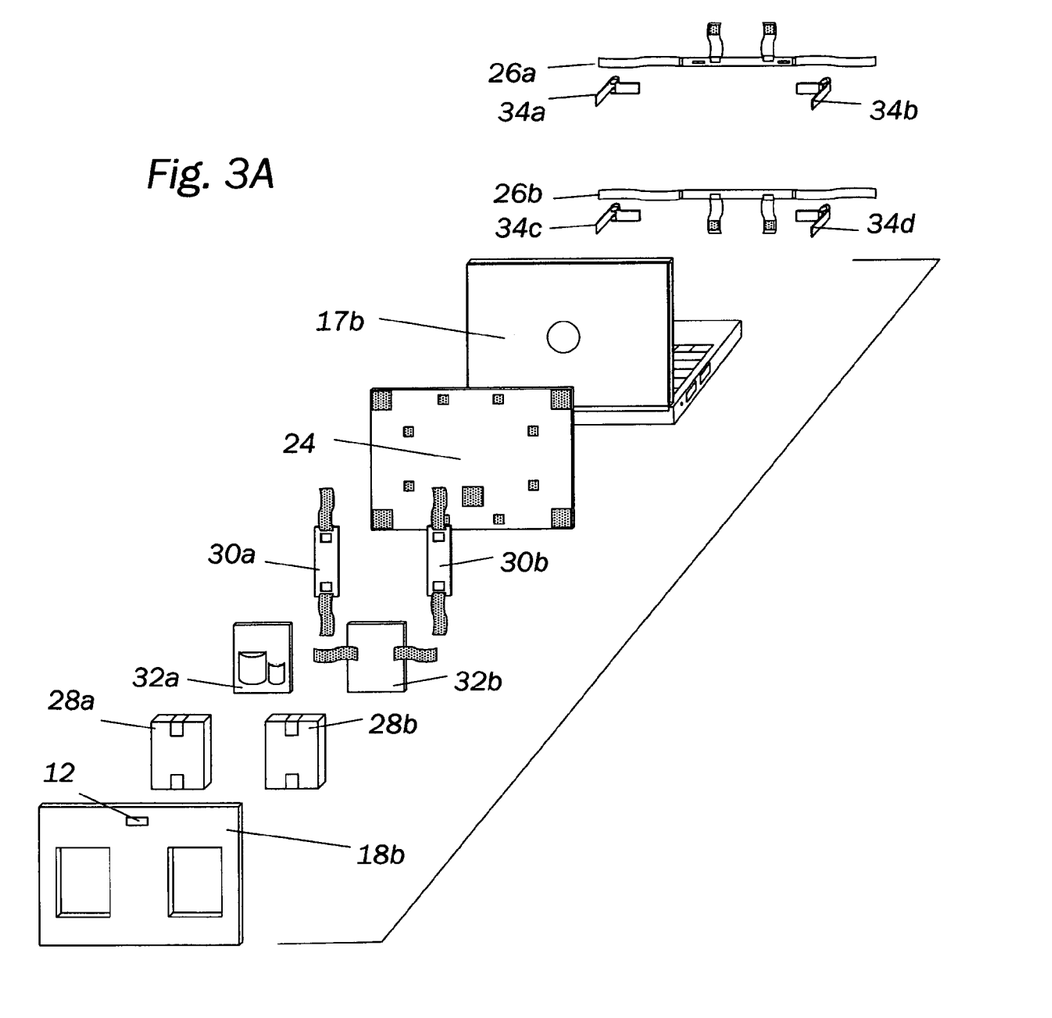
FIG. 3A is an exploded view of components in an advanced embodiment of a case cover as installed on a standard device
Figure 3B:
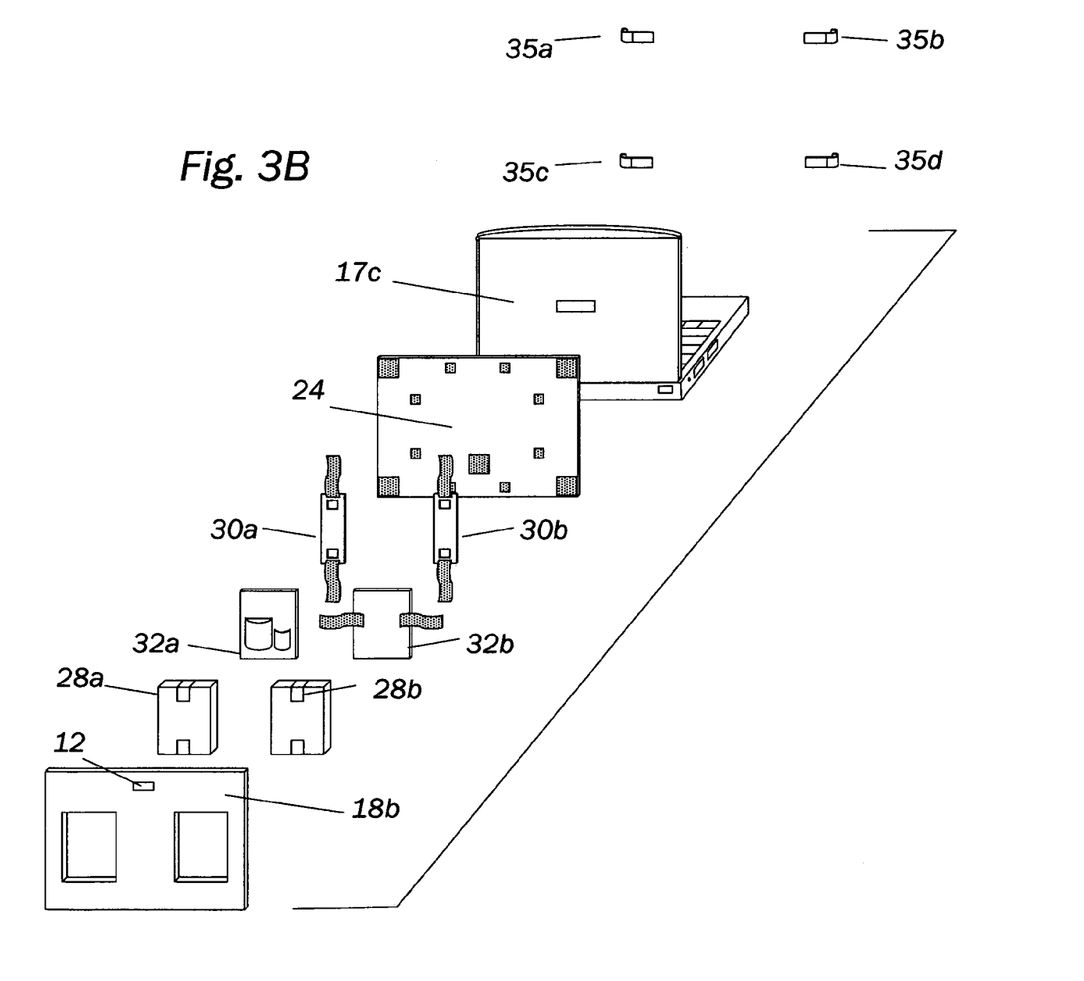
FIG. 3B is an exploded view of components in an advanced embodiment of a case cover as installed on a device adapted for use with a case cover

Preferred Embodiment Implementing Interchangeable Means of Joining and Attachable Components—FIG. 3

FIG. 3A shows an advanced embodiment of an attachable device case with interchangeable components as implemented for use on a standard notebook computer device 17b configuration. This embodiment implements a strap and clasp means of joining for a standard device implementation having no adaptation for case attachment.

FIG. 3B shows the embodiment which implements a clip joining means for a device 17b implementation that has been adapted with fittings that correspond to fastening members of case 10.

One common element between these embodiments (FIGS. 3A and 3B) is case utility panel 24. Panel 24 is the attachment base and support means for case 10 components and any contained devices and articles. Panel 24 is also the case body attachment base for whichever presently preferred joining means is implemented. Panel 24, which is hidden in the final assembly, is made of a thin lightweight rigid material suitable for supporting the weight of the other case 10 components and contents. The size of panel 24 would be approximately the height and width dimensions of the corresponding body enclosure member of the device implementations to which it will be attached. It has hook-and-loop fastener strips attached or is covered entirely with hook-and-loop material to which other case components will attach.

An outermost presentation panel 18b (FIGS. 3A and 3B) is assembled using techniques known by those skilled in arts such as the manufacture of business cases, handbags, luggage or other similar products. It comprises one or more layers of leather, vinyl, fabric, plastic, rubber, metal or other material. The size of panel 18b in this implementation would be approximately the height and width dimensions of the device implementations for which it is intended and would therefore substantially conform to device 17b or 17c Panel 18b in this figure implements an interchangeable containment feature embodiment having openings which allow attachable compartment enclosures 28a and 28b to pass through and be accessible after all components are attached. Hook-and-loop fasteners are attached to the rear of panel 18b in a configuration that corresponds to hook-and-loop fasteners on panel 24.

Retaining Strap Means of Joining—FIG. 4

Figure 4A:
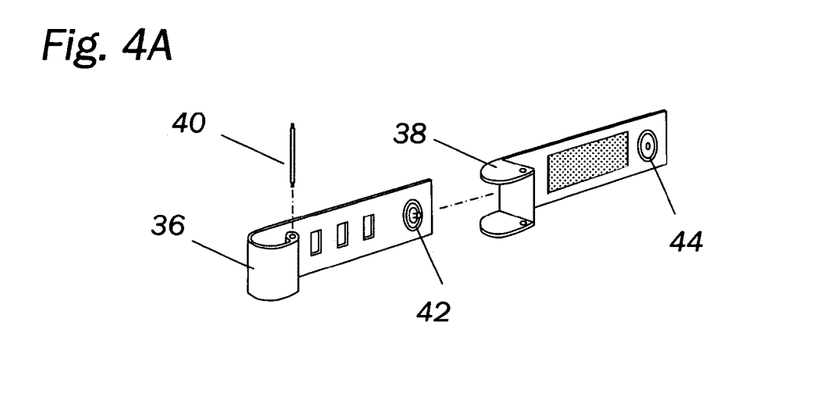
FIG. 4A is an exploded view of a strap clasp assembly

To implement a clasp retaining strap interchangeable joining means (as shown in FIG. 3A), four clasp mechanisms for grasping and drawing straps 26a and 26b are attached to panel 24. FIG. 4A shows a close-up view of the clasp assembly for clasps 34a, 34b, 34c and 34d each comprising five parts: strap clasp outer arm 36, strap clasp inner arm 38, strap clasp spring bar 40, strap clasp male snap 42 and strap clasp female snap 44. Outer arm 36 and inner arm 38 are preferably made from any type of sheet metal suitable for securing straps 26a and 26b. Outer arm 36 is cut or punched with protruding tabs for hooking the horizontal strips of straps 26a and 26b (which are punched with corresponding holes) and drilled and fitted with an appropriately sized male snap 42 on one end.

Outer arm 36 can be formed by rolling or bending one end of a piece of metal into a hollow cylinder with the approximate diameter of spring bar 40. Then, outer arm 36 is bent creating an arc having a diameter that is approximately the sum of the depth of device 17b body enclosure member, the thickness of panel 24 and the thickness of the corresponding hook-and-loop fasteners attached to panel 24 and inner arm 38. Inner arm 38 is formed by using a "T" shaped piece of metal. The arms of the "T" preferably extend the diameter of the arc of outer arm 36 and are shaped in a semi-circle to match outer arm 36. Inner arm 38 is drilled or punched with holes on each arm that will align with the cylinder of outer arm 36. Inner arm 38 is drilled and fitted with appropriately sized clasp female snap 44 that will align with clasp male snap 42 on outer arm 36. The arms of inner arm 38 are then bent at 90 degree angles to form a bracket. Inner arm 38 is then bent the opposite direction of the bracket to conform to the shape of the side of device 17b section to which it will be attached.

Outer arm 36 and inner arm 38 are connected by first inserting clasp spring bar 40 into the hollow cylinder of outer arm 36 and then outer arm 36 with clasp spring bar 40 inserted is placed inside the bracket shaped opening in inner arm 38 allowing clasp spring bar 40 to expand into the holes in the bent arms of inner arm 38. Inner arm 38 is affixed with one of the hook-and-loop fastener enabling clasps 34a, 34b, 34c, and 34d to fasten to corresponding hook-and-loop fasteners affixed to panel 24.

Figure 4B:
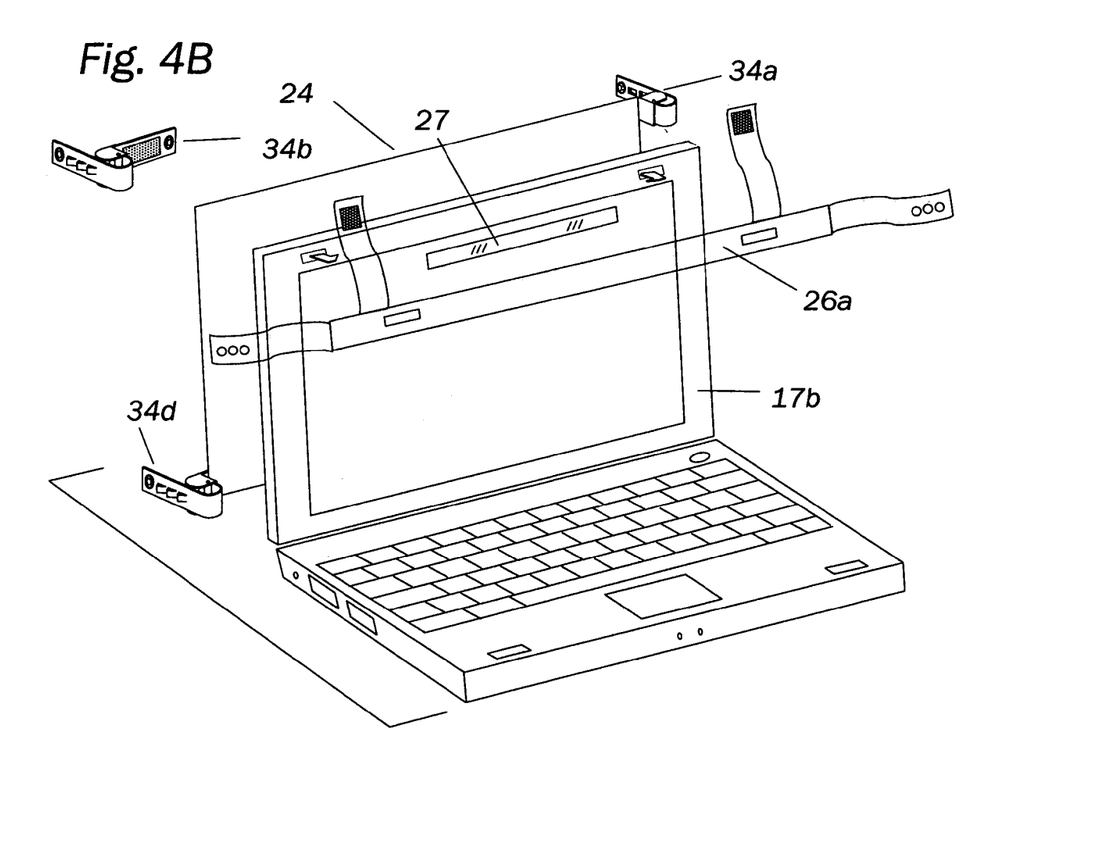
FIG. 4B is an exploded view of a partial assembly of an upper strap, case utility panel, and strap clasp

FIG. 4B shows how panel 24, clasps 34a, 34b, and 34d (clasp 34c is hidden in this perspective) and retaining strap 26a (26b excluded for added clarity) are positioned for attachment assembly. Straps 26a and 26b are made of a thin flexible material sized to horizontally span and wrap around device 17b screen section. The preferred material for straps 26a and 26b is clear vinyl so as to not obstruct device 17b display or border which may contain text or illuminated indicators. Straps 26a and 26b would have openings or contours that correspond to latches or any other protrusions and surface features on the front of device 17b body enclosure member and, therefore, would have to be customized for specific implementations of the device. Additionally, straps 26a and 26b would preferably have vertical strips which would wrap over and under device 17b section. The width and distance between the two vertical strips on each of straps 26a and 26b may also have to be customized to allow for any protrusions or obstructions on the top or bottom edges of device 17b section on specific device implementations.

The horizontal strips of straps 26a and 26b would be punched with holes which would align with and hook onto tabs on clasps 34a, 34b, 34c and 34d enabling the horizontal strips of straps 26a and 26b to be securely grasped and wrapped around the sides of device 17b section. The optional vertical strips of straps 26a and 26b would wrap over the top and under bottom respectively of device 17b display panel and attach to panel 24 using corresponding hook-and-loop fasteners. The horizontal strips provide the primary fastening security while the vertical strips provide additional stability.

Figure 4C:
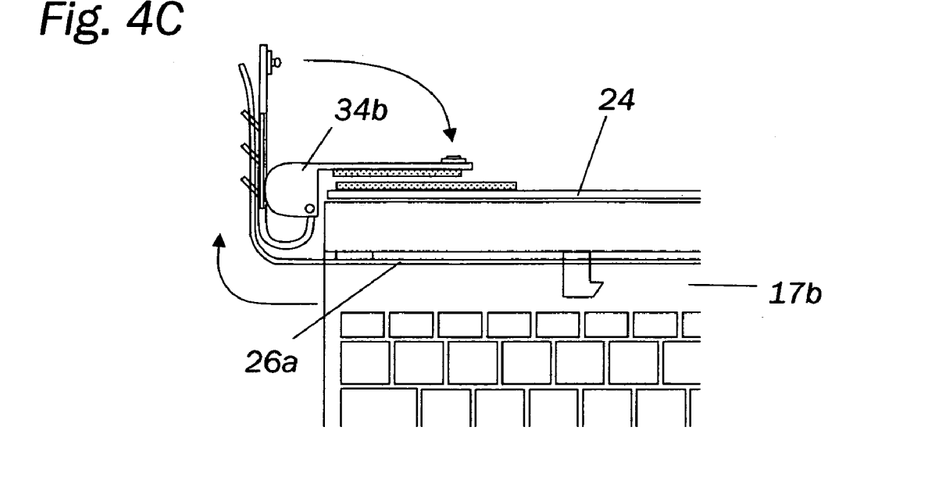
FIG. 4C is a top view of a device with a partially installed upper strap, case utility panel and one strap clasp.

FIG. 4C shows the fastening of strap 26a to clasp 34b as viewed from the top of device 17b. Strap 26a is placed on the front of device 17b section aligning the latches and/or any other surface features with the openings and contours in strap 26a. The horizontal end strip of strap 26a is placed against outer arm 36 in its open position which holds strap 26a slightly away from the surface of device 17b. The holes in the horizontal end strip of strap 26a are aligned with and hooked onto the tabs on clasp outer arm 36. Outer arm 36 is then closed inward towards inner arm 38 and fastened using clasp snaps 42 and 44 or some other fastening means. The closing motion stretches strap 26a outward and around device 17b section which also causes the front of strap 26a to move backwards towards the front surface of device 17b section. The remaining horizontal end strips of strap 26a and 26b are likewise fastened to clasps 34a, 34c and 34d. Although the straps could be fastened directly to panel 18b without use of a clasp or other mechanism, the clasps promote a uniform application by reducing the inconsistencies caused by the installer's abilities or perceptions while only requiring straps 26a and 26b to be customized for a device implementation.

Figure 4D:
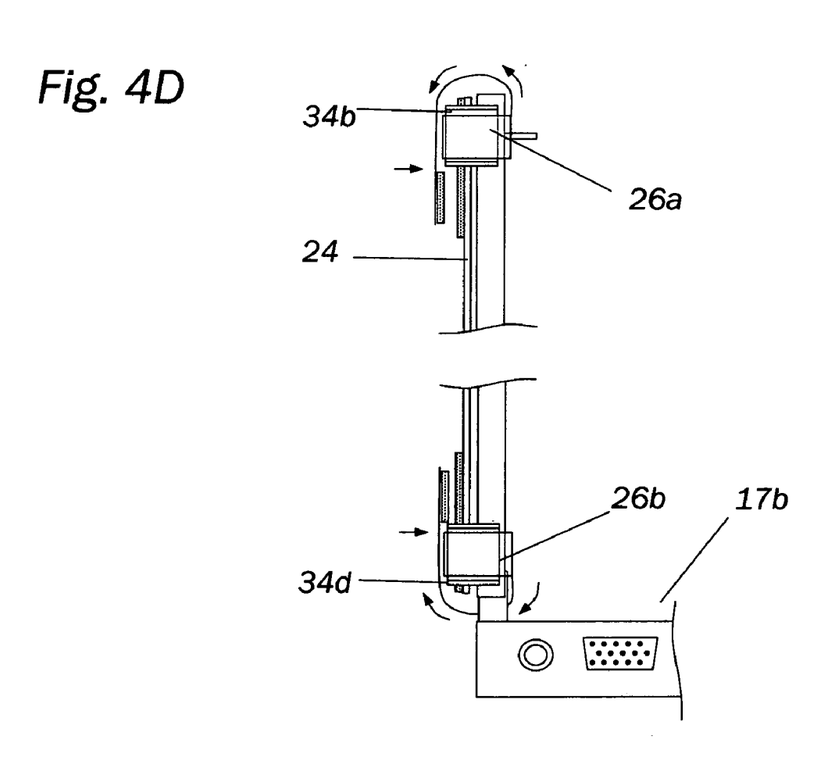
FIG. 4D is a side view of a device with a partially installed upper and lower strap, case utility panel and two strap clasps.

FIG. 4D shows the optional vertical end strips of strap 26a wrapped over the top and under the bottom of a section of device 17b and fastened with corresponding hook-and-loop fasteners on panel 24. In this embodiment which is shown on a standard notebook computer device, the vertical end strips of straps 26a and 26b are passed respectively over the top of the display panel and through openings between the bottom of the display panel and the base section and then fastened to panel 24 with corresponding hook-and-loop fasteners. When all clasps are closed and fastened, and the vertical strips are attached, panel 24 is secured to device 17b.

When the surface of the body enclosure member is curved and/or made of a material to which straps 26a and 26b material may not completely conform, sticker 27 with repositionable adhesive may be applied (in indefinite plurality if necessary) to the surface of the body enclosure member. The exposed side of the sticker would be made of a material that clings to the side of strap surface that would normally contact the surface of body enclosure member. In this embodiment, the surface of the sticker would be cling vinyl which would adhere to the surface of the vinyl in straps 26a and 26b. Straps 26a and 26b would then indirectly adhere and conform to the contours and curves of body enclosure member even when the surface of the member is made of a material on which vinyl may typically slide.

Fastener/Fitting Means of Joining, Integrated Connectivity Means, and Means for Controllably Joining External Structure—FIG. 5

When the clip joining means is implemented into device 17c (FIG. 5A), device 17c body enclosure member is fitted with slotted openings behind each of which is an integrated fitting 50a, 50b, 50c, and 50d that accept the insertion of a thin rigid rectangular-parallelepiped shape form which would be held in place by friction. When the integrated connectivity means is implemented, one or more of the fittings, (50d in this embodiment), is configured to provide communication and/or power generated by or passed through device 17c. Fitting 50d would operate similar to and be created using techniques used in the manufacture of electronic connectivity hardware like female modular cables and connectors as well as slots for memory cards, bus card slots, and media cards. Fitting 50d is wired to device 17c in accordance with the nature of device 17c hardware architecture and the type of connectivity being implemented. In this embodiment, the fitting would be wired to the universal serial bus of device 17c.

Figure 5A:
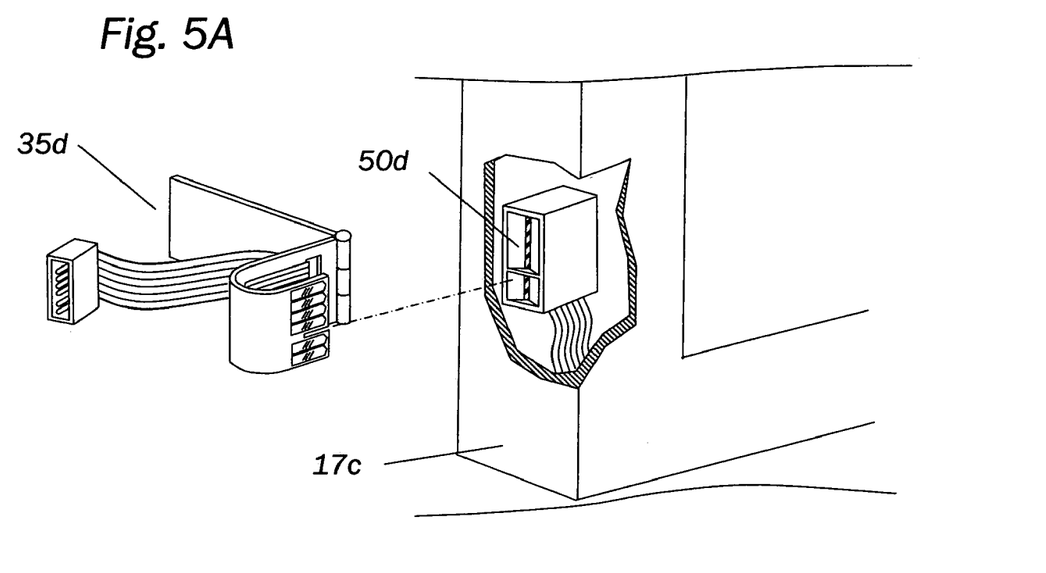
FIG. 5A is a partial sectional view of a clip and fitting with integrated connectivity
Figure 5B:
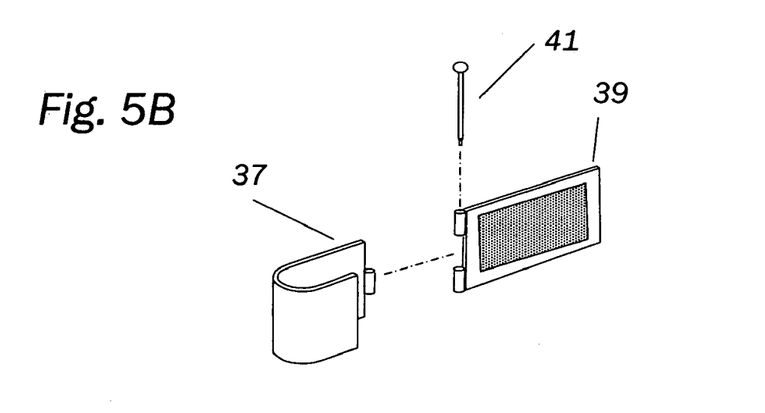
FIG. 5B is an exploded view of a clip assembly

FIG. 5B shows a close-up view of the assembly for clips 35a, 35b, 35c and 35d which consists of three parts: clip outer arm 37, clip inner arm 39, clip hinge pin 41. Clip outer arm 37 and clip inner arm 39 are made from any type of sheet metal suitable for securing panel 24. Outer arm 37 would be of a predetermined shape and size that would mate with the corresponding opening and fittings 50a, 50b, 50c, or 50d in device 17c. Outer arm 37 is bent 180 degrees creating an arc (or, alternatively, at to 90 degree angles) having a diameter of or opening width of approximately the sum of distance between the opening in device 17c and the surface of device 17c back, the thickness of panel 24 and the hook-and-loop fasteners attached to panel 24 and inner arm 39.

Clip inner arm 39 is a rectangular shaped piece of metal of similar width as outer arm 37. The end of outer arm 37 opposite device 17c attachment end is bent or rolled to form a hollow cylinder. One end of inner arm 39 is bent or rolled to for a hollow cylinder. Prior to assembly, the ends of inner arm 37 and outer arm 39 must be cut to some predetermined size that would enable the two parts to align creating a hinge union. Once aligned, hinge pin 41 would be inserted into the cylinder. Hinge pin 41 is either sized to be held in place by friction or reshaped or fitted after insertion to disallow removal. Inner arm 39 is affixed with a hook-and-loop fastener enabling clasps 35a, 35b, 35c, and 35d to fasten to corresponding hook-and-loop fasteners affixed to panel 24.

Figure 5C:
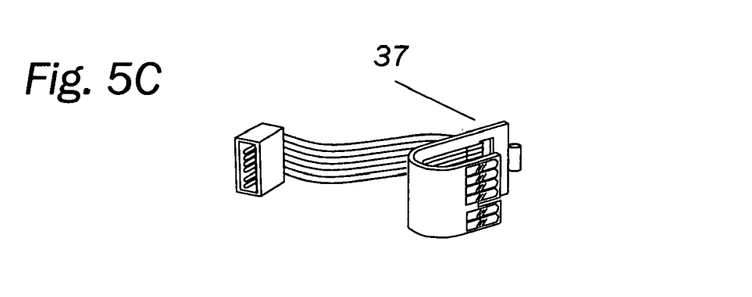
FIG. 5C shows a wired clip outer arm

In this embodiment which implements the communication and power connectivity means integrated with the joining means, FIG. 5C shows clip 35d outer arm 37 which is wired to enable USB or other communication and/or power means to be supplied from device 17c to case 10. The clip connector and wiring structure would be fabricated using techniques used in the fabrication of electronic connectivity hardware like modular cables and connectors, memory cards, bus cards and media cards.

Clip 35d would have leading edge connectors which, when inserted into the corresponding fitting 50d, would connect device 17c to potentially supply case 10 and contents with power and/or data communication. Wired clip 35d edge would preferably be notched to prevent insertion in an incorrect orientation. Clip would preferably have a ribbon style cable (to minimize thickness) connected to the edge connectors and passed through the outer surface of outer arm 37.

Figure 5D:
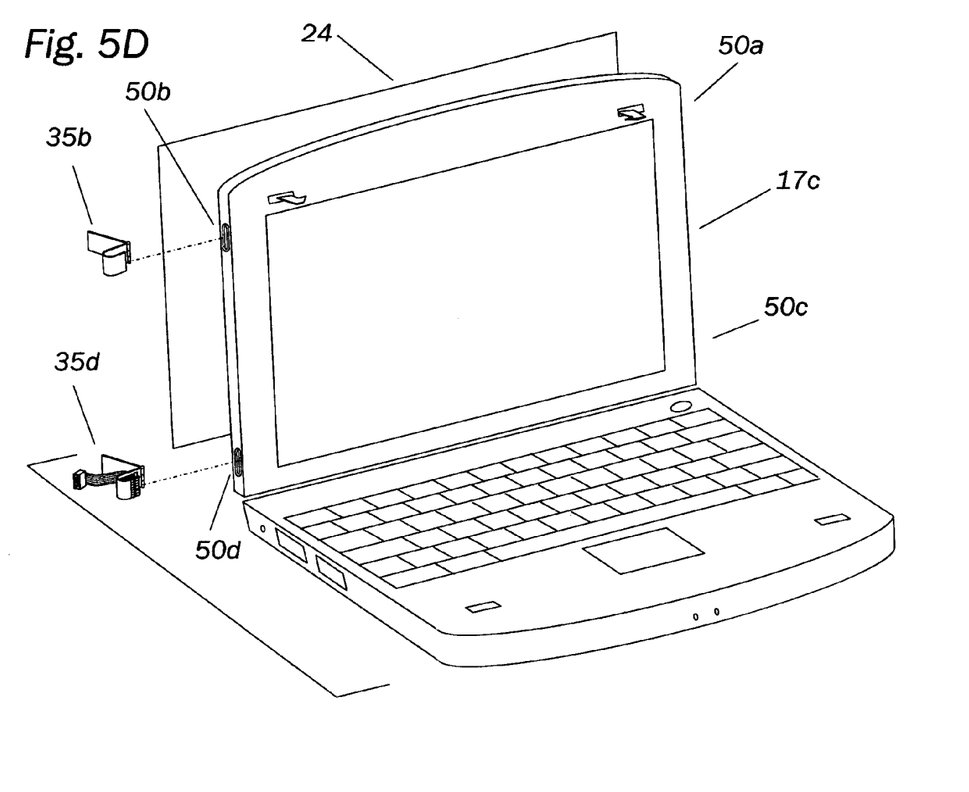
FIG. 5D is an exploded view of a partial assembly of a case utility panel and clip

FIG. 5D shows clip 37d which, in this embodiment, will ultimately be connected to a standard USB hub 22 having a Type Mini B female connection port. However, the connectors shown have an example of a proprietary connecting implementation having a greater number of wires and contacts (4 plus 2) than is required by the current USB specification (4). The proprietary connector mates with an intermediary cable 23 having a corresponding proprietary connector which would then terminate with a Type Mini B Male USB connector which could connect with a standard hub 22 supplying it with power and communication. By adding cable 23, this implementation of clip 35d can be made to accommodate a wider variety of existing and future means of connectivity with varying wiring configurations.

Figure 5E:
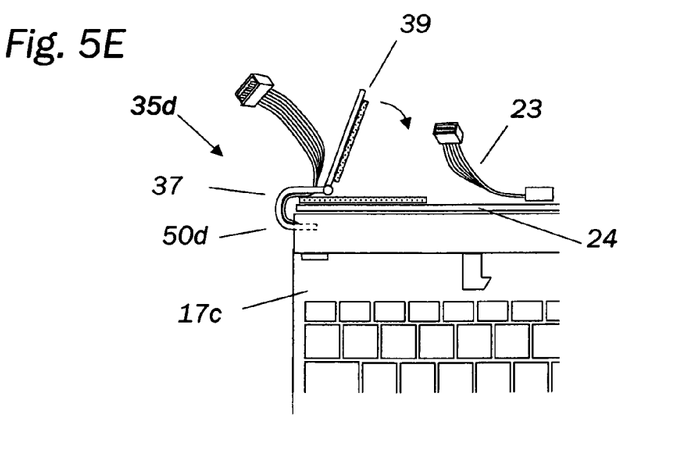
FIG. 5E is a top view of a device with a partially installed case utility panel and clip.

After inserting outer arm 37 edges of clip 35d (35a, 35b, and 35c not shown operate similarly) into fitting 50d and over panel 24, FIG. 5E shows that inner arm 39 of clip 35d is moved inward towards panel 24 and attached with corresponding hook-and-loop fasteners. Outer arm 37 generally applies pressure to hold panel 24 to device 17c. Inner arm 39 reduces any potential lateral movement of panel 24.

Figure 6A:
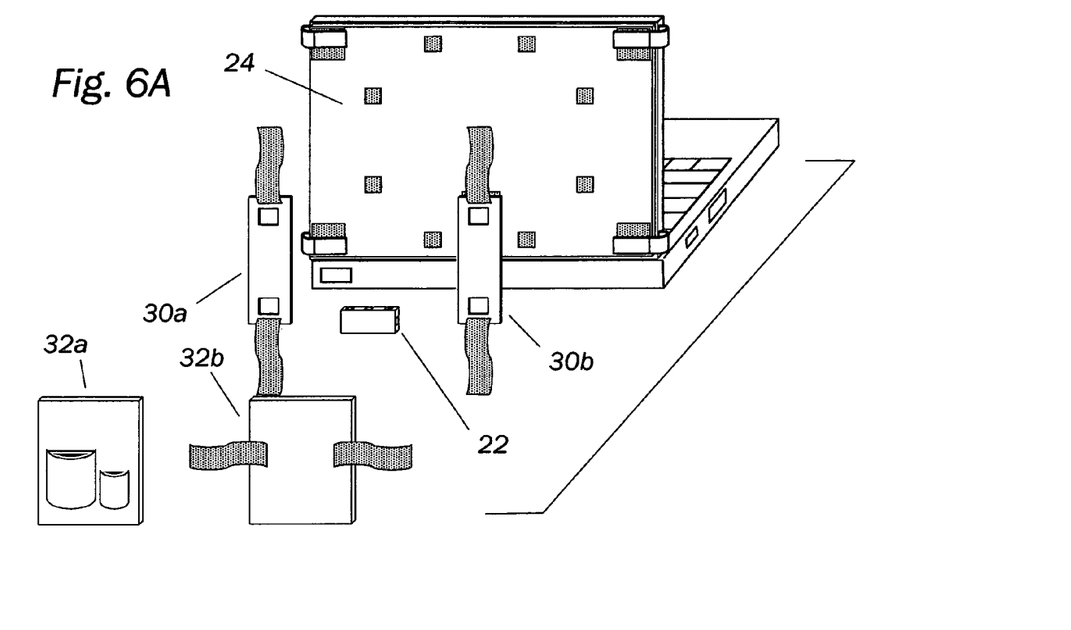
FIG. 6A is an exploded view of device utility panel and USB hub installation
Figure 6B:
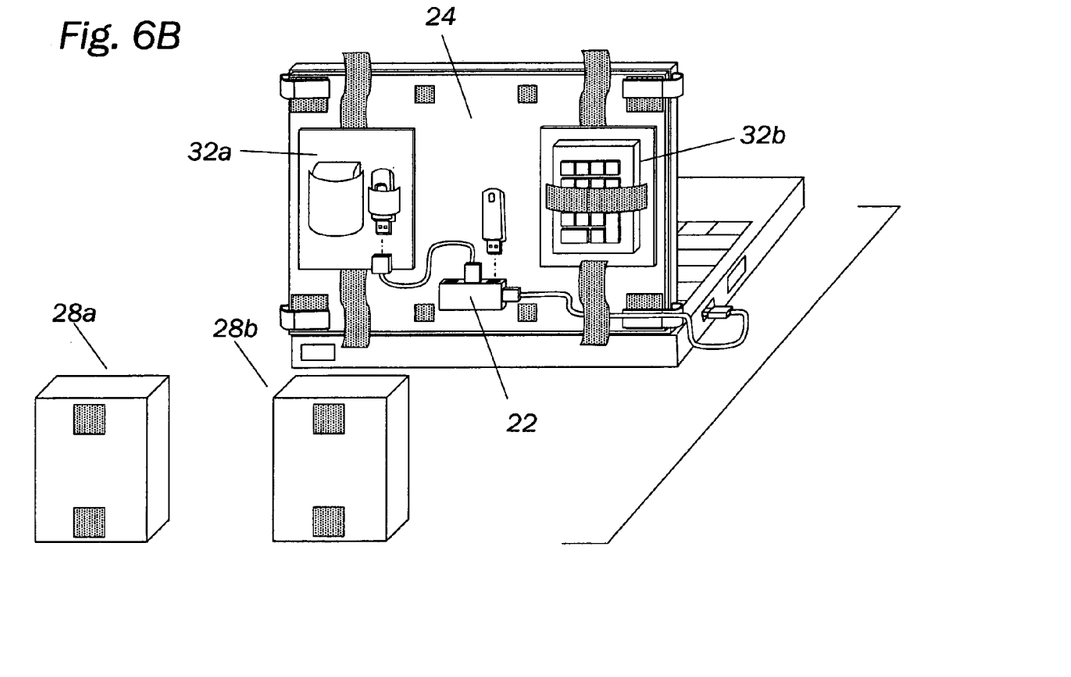
FIG. 6B is an exploded view of a compartment enclosure installation

Attachable Interchangeable Containment Features and Means of Connectivity Derived from a USB Bus—FIG. 6

Illustrated in FIG. 6A, a standard hub 22 is attached to panel 24 using corresponding hook-and-loop fasteners. A thin light-weight hub with a small footprint would be the preferred implementation.

The attachable containment features are implemented in the embodiment as Device/article panels 32a and 32b which are made of a thin light-weight rigid material. Panels 32a and 32b have dimensions suitable for the types and sized of devices and articles that will be attached. This embodiment would have panels 32a and 32b of the preferred dimensions of approximately 6" H×3.75" W to accommodate commonly used items such as mice, numeric keypads, power adapters, eyeglasses, pens, pencils, small notepads, and other articles of similar size and weight.

Hook-and-loop fastening material is applied to what will be the back sides of panels 32a and 32b in an amount only sufficient for supporting the weight of the potential devices to be contained, not so much as to make difficult the detachment of panels 32a and 32b from panel 24. Optionally, a small strip of thin material may be attached to panels 32a and 32b to aid in the pulling and lifting of device panel from panel. Hook-and-loop fasteners would align with the openings on compartment panels 30a and 30b. Panels 32a and 32b are configured on their front sides by whatever means would be necessary to accept insertion or attachment of any device or personal article that is of suitable size and weight for transport and storage inside case 10.

The implementation of panels 32a and 32b shown are a mouse harness and cord/dongle harness on panel 32a and numeric keypad harness on panel 32b. The mouse and cord/dongle harnesses are made be stitching or otherwise fastening suitably sized elastic or other stretchable material onto panel 32a. The numeric keypad harness comprises two corresponding hook-and-loop fastener straps sewn or otherwise fastened to panel 32b.

Panels 30a and 30b, which are only partially visible after assembly, are made of a thin light-weight material. Panels 30a and 30b are cut or punched with openings that allow the fasteners on the rear of panels 32a and 32b to pass through and attach to panel 24. Fastening straps are attached or panels 32a and 32b are shaped to provide strap functionality. Hook-and-loop fasteners are affixed which correspond to those on the exterior of enclosures 28a and 28b. The side of the straps which are exposed in the final assembly could be made of any material that would match or coordinate with the materials of the other exposed surfaces of enclosures 28a and 28b and panel 18b. Panels 30a and 30b must be of a size and materials suitable for the restraint of enclosures 28a and 28b. The dimensions of panels 30a and 30b approximately correspond to the height dimensions of enclosures 28a and 28b and have a width sufficient for the inclusion of pass-through openings for panels 32a and 32b hook-and-loop fasteners.

FIG. 6B shows interchangeable compartments 28a and 28b prior to attachment. The exteriors of enclosures 28a and 28b are visible in the final assembly and are, therefore, made using similar techniques and materials as those of panel 18b. They are made in height, width and depth dimensions that are sufficient to enclose the variety of devices and articles that are suitable for containment in the case body. This embodiment would have the preferred dimensions of approximately 6" H×3.75" W×1.5" D to accommodate commonly used items such as mice, numeric keypads, power adapters, eyeglasses, pens, pencils, small notepads, and other articles of similar size and weight. Enclosures 28a and 28b are attached using the straps of panels 30a and 30b.

Any cables and adapters appropriate for connecting any desired devices may be installed as needed. The cables and adapters would preferably be light-weight and of minimal length to reduce the weight and increase the organization of the device/case assembly. Hub 22 is connected with a USB cable to an available USB port on device 17b.

Figure 7A:
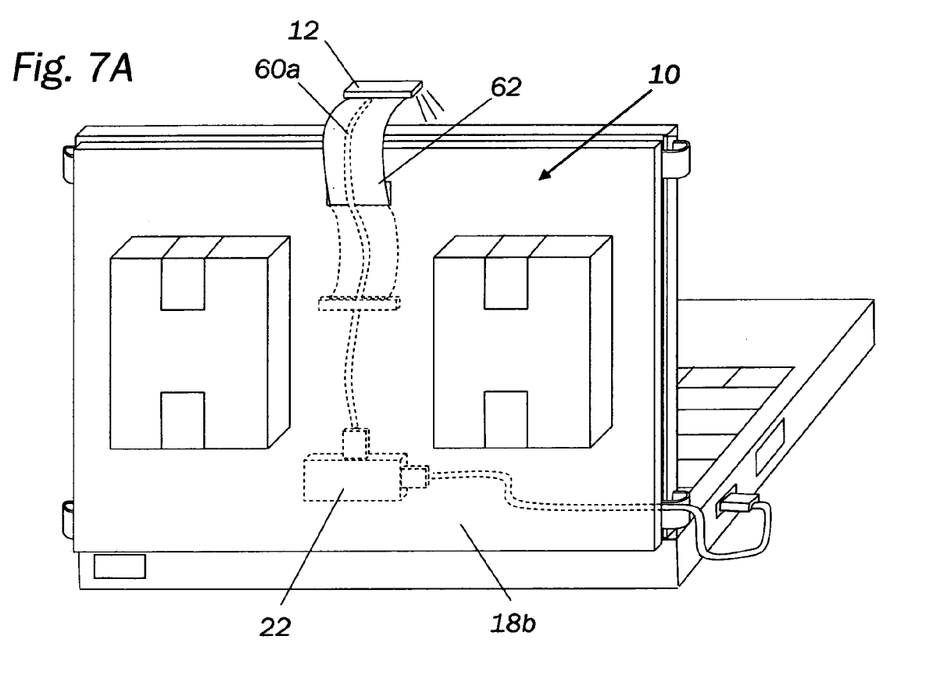
FIG. 7A shows a repositionable LED assembly on an installed case body
Figure 7B:
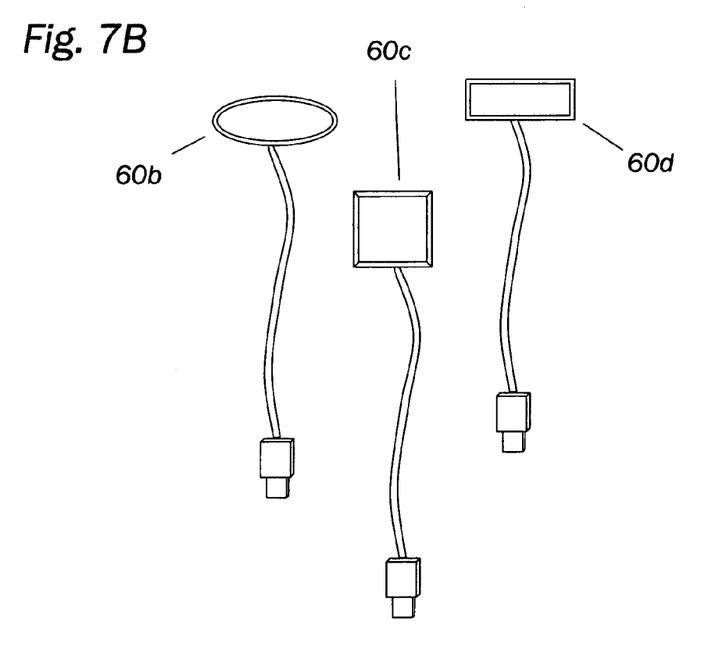

Illumination Means Implemented as a Repositionable Interchangeable USB Powered LED—FIG. 7

FIG. 7A shows the powered case feature and illumination means implemented as a universal serial bus powered interchangeable light emitting diode (LED) assembly 60a with an illuminated emblem 12 which is assembled using commonly known electronics manufacturing techniques. The LED could be any color and intensity that can be powered from device 17b or 17c or other appropriate predetermined source. The LED (adapted with resistance means to adapt to USB standards if necessary) is connected to one end of a USB cable preferably with a Type A male USB connector on the opposite end which would allow the LED to be connected to a standard hub 22 without adaptation. To create an emblem 12, the LED is housed within or behind some presentable form. Emblem 12 would primarily consist of or comprise a clear or translucent material. Additional emblem 12 materials could be any material that is light-weight yet sturdy enough to protect the LED and corresponding wiring. Emblem 12 would be made to attach permanently or controllably to panel 18b (or whatever panel embodiment is implemented) by various means including adhesive, sewing, hardware fastening, friction-fit, snap, and hook-and-loop means.

Additionally, the completed assembly 60a is attached to or contained within a retractable and/or flexible housing 62 which could be positioned within or against some part of the case body during normal use and then extended and flexed to reposition the illumination from emblem 12 over the keyboard or anywhere near device 17b or 17c where illumination is useful. In this embodiment, the housing of emblem 12 is fabricated to allow light pass through the side opposite the presentation side which eliminates the need to turn emblem 12 around to direct the illumination.

In this embodiment, housing 62 is a hollow semi-rigid envelope through which the cable of assembly 60a is passed. Housing 62 would comprise a metallic or other material that can be repeatedly bent throughout its range of motion and still retain its shape. Housing 62 would have some attachment at the lower end to prevent the housing from unintentionally separating from the case body.

Alternate versions of assembly 60a, some examples of which are illustrated in FIG. 7B as assemblies 60b, 60c, and 60d may be attached to panel 18b or inserted into housing 62 as desired.

LED assembly 60a is connected to hub 22 and panel 18b is attached to panel 24 with the corresponding fasteners to complete case assembly.

Operation—FIGS. 6B and 7A

Panels 32a and 32b are accessible by reversing assembly order (FIG. 6B). Some or all of the straps of panels 30a and 30b are lifted from enclosures 28a and 28b. Enclosures 28a and 28b can be open or removed completely to insert and remove their contents as needed. Panel 18b (FIG. 7A) may optionally be removed if greater accessibility to case 10 components is required.

Unless otherwise modified, emblem 12 will illuminate upon being supplied power from the USB connection. Assembly 60a in housing 62 may be repositioned as needed (FIG. 7A).

Advantages

From the description above, the advantages of these case designs become evident. The most obvious of which is that a user will be able to easily transport and access many of their peripheral devices and articles along with their primary devices. The case can be used on a variety of devices whether those devices have been adapted for the case or not. The case provides the user with a variety of options to suit changing needs throughout the life of a device or throughout the use and replacement of similar devices. Additionally, the case will add functionality and aesthetic appeal added to their devices.

In addition to transporting the device, the case allows the transport of various peripheral devices and articles. Coincidentally, the case may also provide some protection of the device as well as the case contents. The case design will often be securely attachable onto a variety of implementations of the device with little interference of normal use. Often, the device will require no adaptation to accommodate the secure attachment of the case. In the preferred embodiments, the secure attachment of the case will cause no permanent disfigurement of the device. The device will have minimal size or weight added allowing the device to be used as it had been prior to case attachment.

CONCLUSION, RAMIFICATIONS, AND SCOPE

Although the description above contains many specifics regarding the presently preferred embodiments, these specifics should not be construed as limiting the scope of any of the embodiments. There are numerous potential alternative embodiments including but not limited to:

- Case 10 can also be used on other similarly configured devices like portable DVD players, video players, gaming devices and desktop computer monitors.
- Components of case 10 could be designed or treated to resist various hazards like moisture, heat, cold, fire, stains, etc. Depending on the implementation, the components may also be ruggedized to offer some protection of device
- Case 10 could be designed to break away from device 17b or 17c if overloaded or if undue force is exerted upon it
- Implementations of case 10 can be customized to more closely conform to specific implementations of device 17b or 17c for functional or
- Case 10 components can be embellished with a variety of items including (but not limited to) beads, crystals, embroidery, metal, jewels and embossments.
- Case 10 components may be imprinted with photo images and graphics
- Panel 18a or 18b can be made from any material suitable for the manufacture of case 10, the level of functionality desired and case 10 intended environments. Some alternatives include leather, vinyl, fabric, wood, plastic and metal.
- Panel 18b can be made of stretchable material allowing it to be stretched to fit varying sizes of devices. Alternatively, panel 18b may be made of a flexible convex form which would allow it to be applied convex to fit a smaller area or flattened to fit a larger area. Riser apparatuses can be placed under and around panel 18b to raise the center of the panel thereby making its edges attachable to a smaller area
- Panel 18b and panel 24 could have openings to allow parts of device 17b or 17c surface to show through. For example the brand name that usually appears in the rear center of a device could be left unobstructed. Panel could be made to cover only part of device 17b or 17c and remaining case components. For example, the corners of panel 18b could be cut away and decorative versions of clasps 34a, 34b, 34c, and 34d or clips 35a, 35b, 35c, and 35d could be exposed in the final assembly.
- Instead of hook-and-loop fasteners, any component may use other existing or future means of attaching components. Some possible means include, static-cling, friction, magnetism (if adapted to prevent interference with device and accessories), etc.
- For devices with a plurality of body enclosure members, a coordinated case body can be attached to the additional members. The additional case body would have the same or similar attachment and functional properties as the primary case body. For example, as laptop notebook computer devices become lighter in weight, a lower case body connected to the lower base compartment may be required to balance the additional weight added by the attachment of a case body to the upper compartment. The clasp, clip, or other joining means may be adapted to conform to the size and shape of the additional case body member.
- A handle or strap may be attached to case 10 to enable easier conventional transport.
- Case 10 could be designed to close around device 17b or 17c like a portfolio. Additionally, case 10 could be sealable by some means like a zipper.
- A coordinated pouch with openings for enclosures 28a and 28b of case 10 can be made to fit device 17b or 17c with attached case 10. This pouch could have handles, straps and/or any other feature to suit the needs of conventional transport.
- A coordinated conventional case can be made with interior moldings to fit the contours of device 17b or 17c with attached case 10 and compartments enclosures 28a and 28b or device 17b or 17c with attached case 10 and enclosures 28a and 28b inside the coordinated pouch mentioned previously. This coordinated conventional case could be made to accommodate additional devices already in their respective enclosures 28a and 28b ready to be interchanged as needed. The coordinated conventional case could have handles, straps, wheels or any other feature to suit the needs of conventional transport.
- The interchangeable features of this case can also be applied to a conventional carrying case and to various other types of cases, handbags, etc.
- Instead of sheet metal, clasps 34a, 34b 34c and 34d and clips 35a, 35b, 35c, and 35d can also be made from molded plastic or blocks of metal drilled to allow the insertion of clasp spring bar 40 or clip hinge pin 41.
- When the clasp embodiment is implemented on device body enclosure members having rounded corners which do not provide a straight edge to support clasp inner arm 38, then inner arm 38, panel 24, or any other applicable case component could be adapted or redesigned to compensate for the void between inner arm 38 and the edge of device 17b.

For devices with curved tops, panel 18 a or 18b and panel 24 can be fabricated to curve more closely to the surface of device 17b or 17c thereby closing any gaps. Additionally, clasps 34a, 34b, 34c and 34d could also be curved.

If device 17b body enclosure member is shaped such that it does not have a side wall against which an object could securely rest, clasps 34a, 34b, 34c and 34d could be forked with prongs that extend forward beyond the front surface of device 17b body enclosure member to add stability while allowing straps 26a and 26b to pass through for wrapping.

Panel 24 can be made in multiple parts which are connected by some adjustable mechanism (e.g. straps with hook-and-loop or buckles) which would enable panel 24 to be sized to fit devices of various sizes.

Instead of straps 26a and 26b, various methods can be used to fasten case 10 to device 17b including, hook-and-loop, adhesives, hooks or clamps, elastic or rubber bands.

Straps 26a and 26b can be made of any material which can fit the surface features device 17b and allow it to close completely and is also sufficiently strong to hold case 10 to device 17b including rubber, leather, nylon, thin flexible or rigid materials, etc.

Clasps 34a, 34b 34c and 34d can be designed and attached in any manner that would accomplish the necessary stretch and wrap required for a secure fit. An example is instead of the preferred hinged lever style clasp, a "rolling pin" apparatus that rests on side of device 17b to aid with wrapping straps 26a and 26b around the edges of device 17b display panel and a ratcheting sprocket wheel on panel 24 for stretching and pulling straps 26a and 26b tight much like the apparatus that winds film inside a 35 mm camera. Additionally, instead of hook-and-loop fasteners other temporary or permanent fastening means may be used including rivets, grommets, straps, snaps, screws, adhesives, etc.

When necessary and device 17b implementation allows, straps 26a and 26b can be designed to span device 17b vertically instead of horizontally.

Instead of a clasp spring bar 40 or clip hinge pin 41, screws, bolts, pins or other similar components could be used.

For devices like convertible notebook computers (where the upper enclosure pivots upwards, swivels 180 degrees, and then is pivoted back down to the base enclosure), tablet style computers (having only one enclosure member), or other similarly configured devices, a variation of the clip embodiment may be employed. Instead of the two hinged arms, the clip would comprise two (or more if necessary) separate parts. The outer arm would be inserted into device fittings 50a, 50b, 50c, and 50d and lock into place. The inner arm would attach to panel 24 (or some other part of the case body) and lock into place. The inner arm and the outer arm would join using some quick-release mechanism enabling the case body to be easily removed from and reattached to device 17c. Additionally, the case body could be designed such that it would stand upright to allow deployment or use of its contents when detached. Depending on the configuration of the case body and device 17c, the case body may be reattached to device 17c in an alternate position for continued use of the device. Furthermore, the stand and reposition facilities could be combined allowing device 17c and the repositioned case 10 assembly to stand in some usable position.

Instead of friction-fit joining, clips 35a, 35b, 35c, and 35d could be fastened to device 17c and held in place by other means including manual or electronic latches, magnets (if adapted to prevent interference with device and accessories), hooks, turn locks, screws, etc.

The quantity, size, and configuration of any containment features can be varied to suit the desired size, functionality, or aesthetic appeal of case 10.

Exterior components which would typically hide the contents of case 10 can instead be clear or translucent enabling visual contact with case 10 contents thereby providing informational, novelty, or promotional benefit.

Enclosures 28a and 28b can have additional openings to accommodate access to devices and articles contained within without opening enclosures 28a and 28b.

The containment features of case 10 could be a combination of various means. For example, instead of two interchangeable enclosures, panel 18b could have one opening for a compartment enclosure and a fixed containment feature like a pocket in the space the second opening would normally occupy In addition to panels 32a and 32b, panel 18b and enclosures 28a and 28b could have utility features like pockets, loops and straps to support additional devices/articles.

Device panels 32a and 32b may have front sides made entirely of hook-and-loop material to which additional fastening implements may be subsequently attached.

Panel 18b could be made convex having device/article panels 32a and 32b device/article panels attached underneath without enclosures 28a and 28b and panels 30a and 30b.

Panel 18b can be purely ornamental and used for aesthetic or promotional benefits. It can be made in one continuous piece without openings or containment features. Alternatively, ornamental apparatuses could be attached in the spaces compartments 28a and 28b would normally occupy.

Instead of a panel 18b, larger devices and articles can be connected directly to panel 24. These devices would themselves become the presentation layer (or part thereof). Some examples are keyboards, speakers, LCD screens, digitizing tablets, mouse pads, copyholders, portfolios (including those which may enclose device 17b or 17c), etc. Panel 24 may require specific adaptation to accommodate the secure attachment of these objects.

Panels 32a and 32b may be configured to carry any number of devices and articles. Since one of the primary advantages of this case design is its ability to accommodate a wide variety of items using the interchangeable components, the variations are virtually limitless. However, some configurations could include hook-and-loop fastener strips or straps, elastic loops, solid material straps or pockets, clear vinyl straps or pockets, device specific clips and cradles, snaps and hooks. One expected common application would be a device panel with three pairs of hook-and-loop strips that accommodate power adapter of device 17b or 17c which generally consists of an oblong block and cords attached to both ends. One hook-and-loop strip pair would secure the block and one each for the cords allowing independent deployment of each part of the adapter as needed.

The features previously permanently attached to panels 32a and 32b can be fitted with fasteners so they can also be interchangeable. For example, instead of sewing or gluing loops that might hold a pencil or pen directly onto panels 32a and 32b, hook-and-loop fitted loops can be placed in any configuration to suit specific needs.

Many of the device implementations that could be attached to or contained within case 10 have a variety of cases or cradles designed for them. The containment features of case 10 could be designed to mate specifically with implementations of these case/cradle designs or even with the device itself. The device, case/cradle, and case containment feature would have integrated corresponding connectors for attachment and for power and/or communication where applicable. The device or the device in its case/cradle could be directly attached to the specially adapted containment feature (e.g. panels 30a and 30b). If the embodiment of case 10 implements the power or communicative connectivity means, the contained device could be supplied with power and/or communication simultaneously with the attachment without additional cabling.

Panels 30a and 30b could have special connectors that allow corresponding devices to be connecting with both power and communication when being attached to panels 30a and 30b eliminating the need for separate attachment and connection.

Hub 22 and connected cables can instead be one prefabricated cable with all of the desired male and female connectors.

Instead of a standard Hub 22 and cables, the connectivity could be integrated into case 10. For example, instead of attaching a standard Hub 22 to panel 24, panel 24 could have ports to connect USB or other devices. Wiring would be integrated into panel 24 and panels 32a and 32b replacing the cables. Panels 32a and 32b would have connectors which mate with connectors on panel 24. To connect a device, you would connect it to a port on panel 32a or 32b and then attach panel 32a or 32b to panel 24.

Hub 22 and any necessary connectors could be integrated into panel 24

In addition to USB, Hub 22 or cable can be enhanced or be replaced with an alternative device to enable the accommodation of other kinds of connectivity including (but not limited to) those which use RCA, S-Video, 3.5 mm, DB, DIN, DVI, IEEE 1394, various media card types, etc. Additionally, Hub 22 could employ means of connectivity which are entirely proprietary.

Clip 34d and/or other clip implementations can include or be replaced with alternative wiring configurations to enable the accommodation of other kinds or future versions of connectivity Components of case 10 can be fabricated with heat-dissipating features like ventilated compartments, fans and heatsinks for use with heat producing devices.

Instead of power derived from device 17b or 17c, the powered case features of case 10 and/or the accessory devices contained could be powered by a variety of self-contained or externally connected sources including batteries, power tapped from device 17b or 17c power adapter, or connection to other devices contained within case 10.

Case 10 could contain any manner of powered or communication enabled features including clocks, dioramas, music boxes, digital picture frames, video screens, LED arrays, fiber optic lighting, etc.

Panel 18b and/or panel 24 could contain powered locks, latches, motorized trays or other components that would help secure and/or deploy the accessory devices and items case 10 contains. When communicative connectivity means is implemented, these features could be activated from device 17b or 17c. For example, if implemented, the repositionable illumination can be extended and retracted with a mechanism powered and controlled by device.

Microchips or other electronic means can be used to control the illumination and other powered features of case 10 as well as devices attached thereto.

Case 10 could include antennas, sensors, or other forms of human or environmental interfaces that would enable or enhance the performance of device 17b or 17c to which case 10 is attached or of the accessory devices contained or attached to case 10. Some examples are wireless network, television, or radio antennas; motion, heat, light (including infra-red), or humidity sensors; and externally or internally accessible, switches, buttons, connectors, or displays. Additionally, case 10 could be equipped with active or passive sensing members which enable case 10, device 17b or 17c, or enabled accessories to sense proximity to one another. For example, if case 10 contains an active sensor, facilities could be enabled whereby the user would receive a reminder notification (via light, sound, etc.) when an accessory with a corresponding passive sensing member is not placed back in case 10 after use. Conversely, a powered accessory device with an active sensor could be enabled such that when it is placed inside case 10 and senses the passive sensing member therein, the accessory device would automatically power off.

The connectivity means could also include connections that allow illuminated indicators to be placed on case 10 that could indicate statuses of device 17b or 17c like power, battery level, battery charging, hard disk activity, etc.

Instead of LEDs in emblem 12, the illumination can be implemented as OLEDs, backlit liquid crystal displays, laser, any low-power low-heat electrical lighting source, or any source of illumination that is adaptable for use with device and case 10.

Illumination may be incorporated into any component of case 10 including functional and decorative features like clasps, clips, cables, zippers, snaps, buttons, tassels, charms, tags, studs, grommets, etc.

In addition to the illumination assembly being interchangeable, the actual illumination source may be interchangeable. For example, when the LED assembly is implemented, the assembly could use a modular bulb assembly which could be user replaceable on demand.

Instead of a detachable LED assembly 60a, emblem 12 may be fastened to panel 18b (or whatever panel embodiment is implemented) and the remaining components of assembly 60a may be detachable.

The illumination means in the flexible and repositionable housing could be combined with other devices such as a camera or microphone.

When the integrated joining means is implemented, device 17c could be designed to withstand the additional forces to which it may be exposed as a result of the attachment of case 10

Any component can be fabricated or treated using existing or future techniques to improve or enhance the properties and characteristics of any component or the assembly as a whole. Some properties and characteristics include weight, size, cost, durability, ease of use, energy consumption, security, safety, stability, compatibility, flexibility, and aesthetic appeal.

Any component may be fabricated using environmentally friendly or socially conscious resources Examples include faux animal hides, recycled materials, conflict-free diamonds, etc.

Any component can be omitted, repeated or combined with other components.

Any component can be attached, secured, or fastened by various means to other components (including but not limited to adhesive, friction, magnets, hook-and-loop, button-and-hole, latches, clips, snaps, screws, rivets, eyelets, etc.).

Any component can be made of any suitable material in any color, texture, or style.

Any component can be resized, reshaped or reconfigured as needed.

Accordingly, the scope of the embodiment should be determined by the appended claims and their legal equivalents, rather than by the examples given.

I claim:

1. A modular system for attaching case components to a portable electronic device, said system comprising:
   at least one rigid utility panel with at least one means for attaching case components, and
   at least one interchangeable means for joining said utility panel with said electronic device comprised of at least one of
      a retaining strap and retaining strap clasp means comprising
         at least one retaining strap for connecting the utility panel to the electronic device, said retaining strap being interchangeable to allow for connecting to electronic devices of varying dimensions, said retaining strap having at least one means for attaching to other components, and
         at least one retaining strap clasp comprising a stationary first member, a means for fastening first member to the utility panel, an articulating second member to grasp and draw the retaining strap to the utility panel, a means for fastening second member to retaining strap, a means for articulately fastening the first member to the second member, and a means for locking the second member into a stationary position, and
      a fitting member and fitting clip means comprising
         at least one fitting member for receipt of fitting clips, said fitting member being accessibly integrated with said electronic device allowing for receipt of fitting clips, and
         at least one fitting clip for inserting into said fitting member comprising a first member having a first end and a second end, said member configured at said first end for insertion into said fitting member and configured towards said second end to extend onto said utility panel, and a means for fastening said first member to said utility panel
   whereby said modular system provides secure and removable attachment to both portable electronic devices of varying dimensions which have been adapted for attachment and portable electronic devices of varying dimensions which have not been adapted for attachment.

2. The modular system of claim 1 wherein said first end of said fitting clip is abbreviated.

3. The modular system of claim 1 wherein said first and second ends of said fitting clip are fixedly spaced to allow simultaneous insertion into said fitting member and positioning onto said utility panel without additional manipulation or contact with said portable electronic device.

4. The modular system of claim 1 further including conductors for transmitting at least one of power and communication.

5. The modular system of claim 1 wherein said fitting clip further includes an articulating second member to further fasten said fitting clip to said utility panel, a means for fastening said second member to said utility panel and a means for articulately fastening said second member to said first member.

6. The modular system of claim 1 further including at least one case component having at least one means for enablement by at least one of power and communication.

7. The modular system of claim 1 wherein at least one of said fitting members is integrated with conductors for transmitting at least one of power and communication.

8. The modular system of claim 1 wherein at least one of said fitting clips is integrated with conductors for transmitting at least one of power and communication.

9. The modular system of claim 1 wherein at least one of said fitting members has additional means for restricting insertion to only correspondingly configured fitting clips.

10. The modular system of claim 9 wherein at least one of said fitting clips has a means to allow insertion into at least one of the correspondingly configured restricted fitting members.

11. The modular system of claim 1 further including at least one device utility panel adapted to receive case components.

12. The modular system of claim 11 further including at least one component utility panel to receive attachment of compartment enclosures and at least one compartment enclosure for covering said device utility panel.

13. The modular system of claim 1 further including a presentation panel for covering the utility panel and case components.

14. The modular system of claim 13 wherein said presentation panel includes openings to allow access to case components.

* * * * *